July 24, 1962     S. W. NICKELLS     3,045,690
HYDRAULICALLY OPERATED MANIFOLD VALVE
Filed Sept. 8, 1959
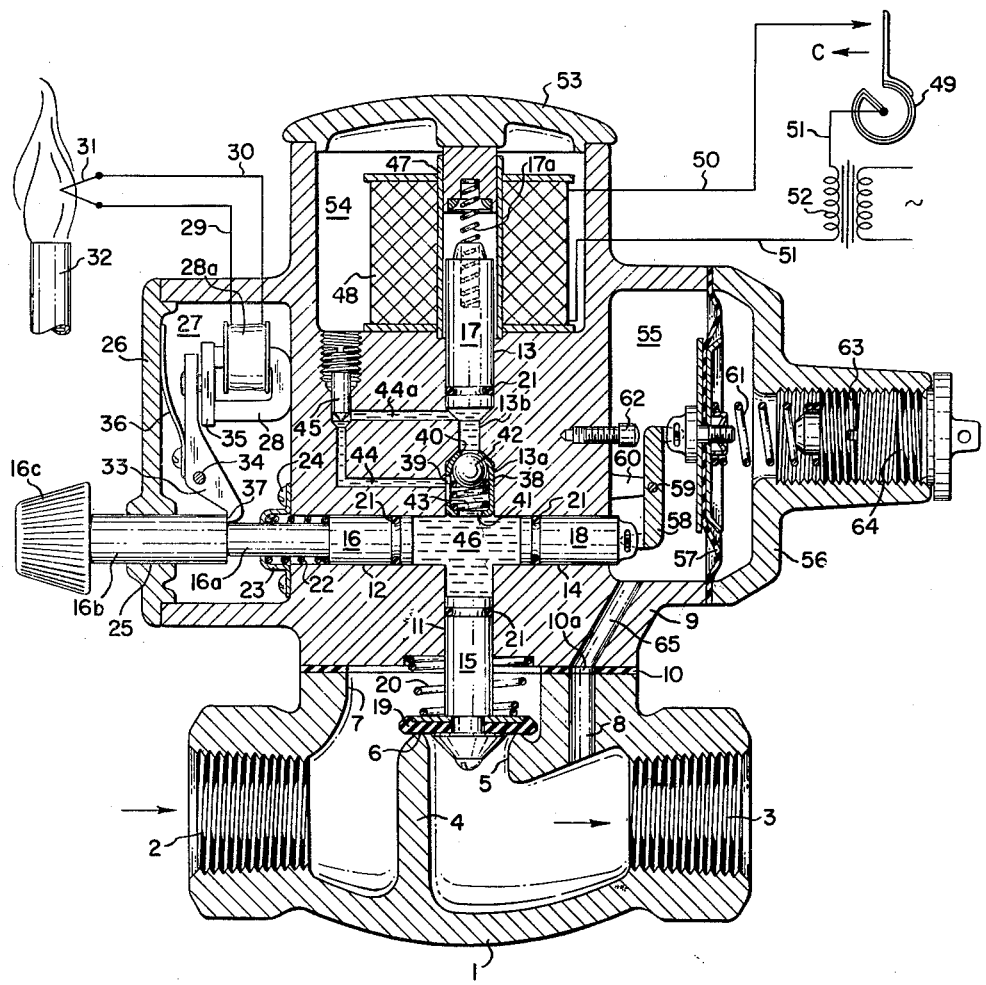
INVENTOR.
STANLEY W. NICKELLS
BY
Alan M. Staubly
ATTORNEY

United States Patent Office 3,045,690
Patented July 24, 1962

3,045,690
HYDRAULICALLY OPERATED MANIFOLD VALVE
Stanley W. Nickells, Wayzata, Minn., assignor to Minneapolis-Honeywell Regulator Company, Minneapolis, Minn., a corporation of Delaware
Filed Sept. 8, 1959, Ser. No. 838,734
4 Claims. (Cl. 137—66)

This invention relates to hydraulically operated controls, such as valves and switches, and more particularly, it relates to a manifold gas valve wherein a single valve is actuated by a plurality of condition responsive means through a hydraulic motion transmitting system.

The gas heating controls industry is constantly trying to reduce the size and expense of controls for fuel burning systems as well as to incorporate many of the necessary control means in a single unit to expedite installation of heating systems.

One of the objects of this invention is to provide a manifold valve which has a plurality of condition responsive means and which is compact and reliable in operation.

Another object of the invention is to provide a manifold valve having a plurality of condition responsive control means operable on a single valve, wherein one of the condition responsive means is a pressure regulator.

Still another object of the invention is to provide a manifold valve of the above-mentioned type wherein a controller for the valve is a solenoid having means for providing slow opening of the valve.

A further object of the invention is to provide a manifold valve having a plurality of actuators for a single valve and having a common fluid filled chamber between the actuators and the single valve.

Other objects of the invention will become apparent upon reading the following detailed description of the invention in conjunction with the accompanying drawing wherein:

The single FIGURE of the drawing illustrates the preferred embodiment of the invention in cross section with the valve shown connected, schematically, to a pilot burner heated thermocouple and to a room thermostat through a transformer.

The manifold valve comprises a valve body 1 having a threaded inlet 2 and a threaded outlet 3, with a partition wall 4 therebetween formed with a hole 5 in the wall which terminates at its upper end in an annular valve seat 6. The valve body has an opening 7 at the top thereof and a vertical bore 8 extending from the outlet chamber of the valve to the top surface of the valve body.

A housing 9 is secured to the top of the valve body 1 by means of bolts (not shown) with a sealing gasket 10 therebetween. The housing has a plurality of intersecting bores 11, 12, 13, and 14 in which are slidably mounted pistons 15, 16, 17, and 18, respectively.

The piston 15 serves as a valve stem for a valve 19 that cooperates with the valve seat 6 to control the flow of fluid through the valve body. The valve 19 is normally biased into seating engagement with the seat 6 by means of a weak compression spring 20. Each of the pistons has an annular groove therein in which is positioned an O ring sealing or piston ring 21.

The piston 16 is normally biased toward the other bores by means of a coiled compression spring 22 which bears at one end against the piston 16 and at its other end against a bracket 23 secured to the housing by bolts 24. The piston 16 has a stem extension 16a with an enlarged diameter portion 16b at its outer end which, in turn, extends through an opening 25 in a cover plate 26. A knob 16c is formed on the outer end of portion 16b.

The plate 26 covers a chamber 27 formed as a recess in the side wall of the housing 9. Within the housing is an electromagnet 28 secured to the housing by means of bolts (not shown). A coil 28a of the magnet is connected through lead wires 29 and 30 to a thermocouple 31 adapted to be heated by a flame of a pilot burner 32. A lever 33 is rockably mounted on a pivot 34 anchored in the side wall of the chamber 27 and carries at one of its ends an armature 35 that is adapted to be held by the magnet 28 when the magnet's coil is energized. A leaf spring 36 normally biases the armature into engagement with the electromagnet. The other end of the lever 33 has a latch portion 37 which is adapted to engage under the shoulder formed between the piston extensions 16a and 16b. The magnet is capable of holding the piston 16 in its outer position, as illustrated in the drawing, only so long as the thermocouple 31 is being heated by a pilot flame. When the thermocouple is not heated or ceases to be heated the spring 22 is sufficiently strong as to overcome the spring 36 so as to pivot the lever 33 counter-clockwise and to permit the piston 16 to move toward the other bores. The piston 16 can be moved outwardly only by means of the manually operable knob 16c.

The bore 13 is formed in two spaced co-axial sections with a reduced diameter section 13b therebetween. The portion of the bore 13 adjacent and communicating with the bores 12 and 14 is designated by the reference numeral 13a. Positioned in the bore portion 13a is a cage 38 having a side opening 39, a top opening 40, and a bottom opening 41. Positioned within the cage is a ball check valve 42 that is biased against the opening 40 by means of a coil compression spring 43. The passage 44 extends from the bore 13a, in alignment with the opening 39, to a needle valve 45 and then returns through its passage extension 44a to the top of the bore portion 13b. It is thus seen that a fluid 46 in the bores 11, 12, 13, and 14 is adapted to flow only slowly from the bore portion 13a to the bore portion 13b as the piston 17 moves upwardly in the bore 13 but is adapted to move rapidly from bore 13b to bore 13a as the piston 17 moves downwardly.

The piston 17 is also the plunger of a solenoid comprising a solenoid tube 47 and a solenoid coil 48. The coil 48 is connected to a room thermostat 49 through leads 50 and 51, there being a secondary coil 52 of a transformer in the lead line 51. A cover 53 seals the chamber 54 formed in the top of the housing 9 and in which the solenoid is mounted.

A chamber 55 is formed in the side of the housing 9 on the opposite side thereof from the chamber 27. Secured over the chamber 55 is a housing 56 which clamps the periphery of a diaphragm 57 to the outer edge of the chamber 55. A lever 57 is pivoted intermediate its ends on a pivot 59 which, in turn, is supported on the housing 9 by means of brackets 60 molded thereon. One end of the lever is connected by a pin and slot connection to the diaphragm while the other end thereof is connected by a pin and slot connection to the piston 18. A coiled compression spring 61 normally biases the lever counterclockwise to move the piston 18 away from the bores 13a and 11. An adjustable stop 62 limits the amount of counterclockwise movement of the lever 58. The loading on the spring 61 may be adjusted by an adjustable abutment screw 63 positioned in the threaded stack of the housing 56. A plug 64 seals the opening to the stack. The chamber 55 communicates with the outlet of the valve body 1 through a passage 65 which registers with an opening 10a in the gasket 10 and the passage 8 in the valve body. The strength of the spring is such that should there be a stoppage in the gas line downstream of the outlet, the diaphragm 57 will move the piston 18 to completely close valve 19.

*Operation*

The valve is illustrated as being in an operating condition it would have if the valve were installed in a heating system and the system has been placed in operation. That is, in the condition wherein there is a pilot flame playing on the thermocouple 31 and the safety pilot portion of the valve being manually reset to a valve open or fluid flow permitting condition with the plunger 16 held outwardly by the latch 37, due to the magnet coil 28a being energized. However, the valve remains in its "off" or closed position due to the fact that the room thermostat is in a satisfied condition.

Upon the temperature surrounding the thermostat falling below its control point, the contacts thereof will close completing a circuit through the solenoid coil 48. When this happens, the plunger 17 will move inwardly of the tube, or upwardly as viewed in the drawing, directly against the bias of spring 17a and indirectly against the bias of spring 20 but, due to the fact that the liquid 46 can only flow slowly past the valve 45, the valve 19 will only move slowly to its "on" or open position compressing spring 20. The valve will move open due to the fact that the spring 20 is only a light spring and as the plunger 17 moves upwardly it would tend to create a vacuum in the bores which would enable the atmospheric pressure acting on the bottom of the valve 19 to lift it off of its seat. The piston 18 will not move inwardly due to the fact that the spring 61 is quite strong or at least considerably stronger than the spring 20. With the valve in its open position, pressure will build up in the downstream side of the valve seat and this pressure will be communicated through the passages 8 and 65 to the chamber 55 to cause movement of the diaphragm 57 with variations in said pressure. Should this downstream pressure become excessive, the spring 61 will be compressed, which will cause the lever 58 to move in a clockwise direction moving the piston 18 inwardly toward the bores 13a and 15 and thus causing the valve 19 to be moved partially toward the valve seat so as to reduce the pressure at the valve outlet. It is thus seen that the position of the valve 19 will be regulated to maintain a uniform outlet pressure by means of the pressure regulator once it has been placed in operation by the valve 19 being open.

The valve will remain in its open condition and operating as described so long as the room thermostat is closed and so long as the pilot flame is present. Should the pilot flame become extinguished, the coil 28a will be deenergized and the spring 22 will cause the piston 16 to move toward the bore 11 to close the valve 19. Likewise, upon the room thermostat being satisfied, the coil 48 will be de-energized permitting the spring 17a to force the piston 17 downwardly or out of the tube. The downward movement of the plunger 17 will cause unseating of the valve 42 and quick movement of the valve 19 to its closed position.

From the above description of the invention, it is readily seen that a very compact manifold valve has been provided that enables the combining of a plurality of condition responsive means in a single small housing and still provide a valve actuating arrangement with a minimum of mechanical parts. By keeping the mechanical connections to a minimum, there is less chance of the relationship of the parts to become out of adjustment due to wear of the parts. The arrangement also makes it possible for the various components or controllers to be re-arranged in many positions with respect to each other and still be able to be operably inter-related with the control valve due to the ability of the fluid for actuating the valve to travel through tortuous paths to communicate with the other controlling means for the valve.

As it is obvious that the modification may be made in the invention without departing from the spirit thereof, the scope of the invention is to be determined from the appended claims.

I claim as my invention:

1. A manifold gas valve comprising a valve body having an inlet and an outlet and a valve seat therebetween, said valve body having an opening through a wall thereof, a control housing on said valve body sealing said opening, a plurality of communicating bores in said housing, liquid filling all of said bores, a plurality of movable walls sealing said bores, a valve cooperable with said valve seat and operably connected to one of said movable walls for movement thereby between "on" and "off" positions, and a plurality of condition responsive means in said housing operably connected to other of said movable walls, one of said condition responsive means being a pressure regulator, another of said condition responsive means including a manually reset and flame responsive latching mechanism, each of said condition responsive means being so arranged as to be capable of moving said valve toward its "off" position but requiring all of said condition responsive means to be in their "on" positions to enable said valve to be in its "on" position.

2. A manifold gas valve comprising a valve body having an inlet and an outlet and a valve seat therebetween, said valve body having an opening through a wall thereof and a passage through said wall thereof communicating with the outlet, a control housing on said valve body sealing said opening, a plurality of interconnected bores in said housing, a separate movable wall sealing each of said bores, a valve cooperable with said valve seat and operably connected to one of said movable walls for movement thereby between "on" and "off" positions, and a plurality of condition responsive means in said housing operably connected one each to said movable walls, liquid in the space between said movable walls, one of said condition responsive means being a pressure regulator having a pressure chamber communicating with said passage and another of said condition responsive means being responsive to a condition indicative of unsafe operation of apparatus of which the manifold valve is a part, each of said condition responsive means being so arranged as to be capable of moving said valve toward its "off" position but requiring all of said condition responsive means to be in their "on" positions to enable said valve to be in its "on" position.

3. In a manifold fuel valve, the combination comprising a valve body having an inlet and an outlet and a valve seat therebetween, said valve body having an opening through a wall thereof and a passage through said wall thereof communicating with the outlet, a control housing on said valve body sealing said opening, a plurality of interconnected bores in said housing, a first movable wall sealing one of said bores, a valve movable between "on" and "off" positions with respect to said valve seat and operably connected to said first movable wall, a second movable wall sealing another of said bores, liquid in the space between said movable walls, a pressure regulator having a pressure chamber communicating with said passage and pressure responsive means operably connected to said second movable wall, and condition responsive means connected to a third of said movable walls, said pressure regulator having means biasing said second movable wall in a direction to cause opening of said valve and means to prevent said biasing means from opening said valve when the valve is in its closed position, each of said condition responsive means being so arranged as to be capable of moving said valve toward its "off" position but requiring all of said condition responsive means to be in their "on" positions to enable said valve to be in its "on" position.

4. A manifold fuel valve comprising a valve body having an inlet and an outlet and a valve seat therebetween, said valve body having an opening through a wall thereof and a passage through said wall communicating with the outlet, a control housing on said valve body sealing said opening, a plurality of interconnected bores in said housing, liquid filling all of said bores, a plurality of movable walls each sealing a separate one of said bores, a valve cooperable with said valve seat and operably connected to one of said movable walls for movement thereby between "on" and "off" positions and a plurality of condition responsive means in said housing one each being operably connected to a separate one of said movable walls, one of said condition responsive means being a pressure regulator having a pressure chamber communicating with said passage, another of said condition responsive means being a slow opening-quick closing power actuator and an additional one of said condition responsive means being a flame responsive-manually reset safety actuator, each of said condition responsive means being so arranged as to be capable of moving said valve toward its "off" position but requiring all of said condition responsive means to be in their "on" positions to enable said valve to be in its "on" position.

References Cited in the file of this patent

UNITED STATES PATENTS

| | | |
|---|---|---|
| 1,815,157 | Loughead | July 21, 1931 |
| 1,905,414 | Leach | Apr. 25, 1933 |
| 1,979,779 | Tobin | Nov. 6, 1934 |
| 2,327,582 | Dougherty | Aug. 24, 1943 |
| 2,365,557 | Keith | Dec. 19, 1944 |
| 2,586,972 | McKenzie | Feb. 26, 1952 |
| 2,635,632 | Mayer et al. | Apr. 21, 1953 |
| 2,635,637 | Karrer | Apr. 21, 1953 |

FOREIGN PATENTS

| | | |
|---|---|---|
| 458,350 | Great Britain | Dec. 17, 1936 |